United States Patent
Kanbe et al.

(10) Patent No.: US 6,924,048 B2
(45) Date of Patent: Aug. 2, 2005

(54) MAGNETIC RECORDING MEDIUM AND A MAGNETIC STORAGE APPARATUS

(75) Inventors: Tetsuya Kanbe, Yokohama (JP); Yuzuru Hosoe, Hino (JP); Ichiro Tamai, Hachioji (JP); Yoshio Takahashi, Koganei (JP); Kiwamu Tanahashi, Fujisawa (JP); Satoshi Matsunuma, Kamakura (JP); Yoshihiro Shiroishi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 10/413,481

(22) Filed: Apr. 15, 2003

(65) Prior Publication Data

US 2003/0203239 A1 Oct. 30, 2003

Related U.S. Application Data

(63) Continuation of application No. 09/343,721, filed on Jun. 30, 1999, now Pat. No. 6,569,545.

(30) Foreign Application Priority Data

Jul. 3, 1998 (JP) .......................................... 10-188513

(51) Int. Cl.[7] .............................. G11B 5/66; G11B 5/70
(52) U.S. Cl. ................... 428/694 T; 428/692; 428/900
(58) Field of Search ..................... 428/694 T, 694 TS, 428/692, 900

(56) References Cited

U.S. PATENT DOCUMENTS

| 4,042,341 A | 8/1977 | Smeggil ..................... 428/678 |
| 5,478,661 A | 12/1995 | Murayama et al. ...... 428/694 T |
| 5,989,674 A | 11/1999 | Marinero et al. .......... 428/65.3 |
| 6,156,404 A | 12/2000 | Ross et al. ................. 428/65.3 |
| 6,221,508 B1 | 4/2001 | Kanbe et al. ............... 428/617 |

FOREIGN PATENT DOCUMENTS

| JP | 4-153910 | 5/1992 |
| JP | 05-325164 | 5/1992 |
| JP | 7-073441 | 3/1995 |
| JP | 7-098835 | 4/1995 |
| JP | 08-083418 | 7/1995 |
| JP | 7-311929 | 11/1995 |
| JP | 8-045073 | 2/1996 |
| JP | 10-003638 | 6/1996 |

OTHER PUBLICATIONS

K. Ichihara et al, "High–Density Recording Capability of Granular Media Composed of CO–Pt Grains and SiO2 Matrix," IEEE Transactions on Magnetics, vol. 34, No. 4, Jul. 1998, pp. 1603–1605.

Applied Physics Letters, vol. 52, No. 6, Feb. 8, 1988, "Granular Metal Films as Recording Media", S. Liou et al, pp. 512–514.

*Primary Examiner*—Holly Rickman
(74) *Attorney, Agent, or Firm*—Mattingly, Stanger, Malur & Brundidge, P.C.

(57) ABSTRACT

A magnetic storage device has a magnetic layer, the magnetic crystal grains of which are separated by a nonmagnetic phase. The typical crystal grain is in the approximate shape of a sphere or an ellipsoid. The thickness of the magnetic crystal grains, which is in the direction perpendicular to the surface or the film, is smaller than that of the thickness of the magnetic film. The ratio of the coercive force, which is measured in the circumferential direction, to the coercive force, which is measured in the radial direction, (the orientation ratio of the coercive force), is larger than 1.0, but preferably nor greater than 3.0. Further, the area fraction of the magnetic grains having an extended axis within 30° from the circumferential direction is equal to or more than 45%.

7 Claims, 10 Drawing Sheets

MAGNETIC RECORDING MEDIUM AND A MAGNETIC STORAGE APPARATUS

Figure 1:
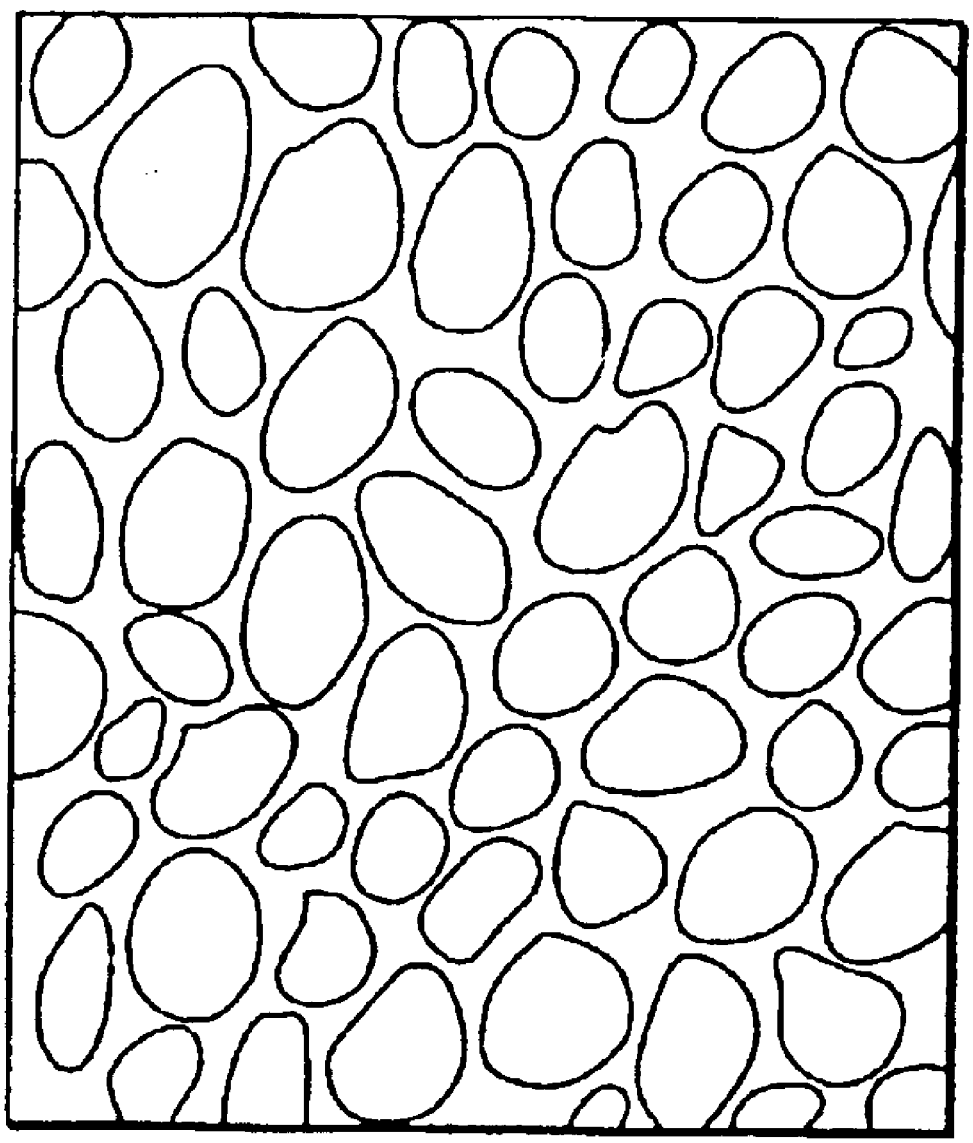

This is a continuation application of U.S. Ser. No. 09/343,721, filed Jun. 30, 1999, now U.S. Pat. No. 6,569,545.

BACKGROUND OF THE INVENTION

1. Field of the Invention

This invention concerns a magnetic storage device, concretely the magnetic storage device having the recording density over 5 gigabits per square inch and the magnetic recording medium to realize the magnetic storage device having the high output, low noise and high stability caused by suppressing the attenuation of output by moderating the thermo-magnetization.

2. Description of the Related Art

Recently, because the recording density has been improved in the magnetic storage device for the computer, more and more noise reduction and high coercivity have been required. The minimizing the crystal grain size in the magnetic layer and the reduction of the magnetic combination of interparticles are effective for the media noise reduction. As a method for minimizing the magnetic crystal grain, forming the new layer (for example, called the seed layer) is being tried. For example of the new layer, it is shown in Japanese Open Patent Application H4-153910 that seed layer of amorphous or very small grain which consists from a kind of Y, Ti, Zr, Hf, V, Nb, Ta, Cr, Mo, W is formed. It is shown in Japanese Open Patent Application H7-73441 that magnetic crystal grain is minimized and media noise is reduced by forming seed layer of amorphous which consists from Cr or V.

A small magnetism crystal grain receives the effect of the heat disturbance. So, the phenomenon that the recorded magnetization disappears with the passage of the time becomes remarkable.

Therefore, extremely small magnetism crystal grains are not desirable because the reliability is down when the recorded data is preserved in the long term.

Also, when magnetism crystal grains are minimized and the magnetic combination of the interparticle is strong, many magnetism crystal grains are inverted their magnetic direction at the same time. So the effect of reducing noise can not been obtained.

So, it is necessary to reduce the exchange interaction between magnetic particles. For this purpose, it is effective to increase Cr concentration in the magnetic layer and to increase the nonmagnetic segregation region of the interface of the magnetic particles. But, magnetization reduces when the Cr concentration increases. So, the record and reproduction output reduces so much that good record and reproduction characteristic can not been obtained.

In the meantime, S. H. Liou proposed a medium that the crystal grain Fe dispersing in the amorphous $SiO_2$ takes the Granular structure. (S. H. Liou and C. L. Chien: Appl. Phys. Lett. 52(6), 8 Feb. 1988) The Granular medium (i.e. the medium which magnetic layer takes Granular structure) has characteristics that the magnetic interaction between the magnetic particles is weak because the magnetic crystal grains are separated by the nonmagnetic phase and media noise is low because the magnetic crystal grains are very small.

As another prior art, it is shown in Japanese Open Patent Application H7-311929 that the Granular medium has a magnetic layer with magnetic crystal grains of Co alloy and nonmagnetic phase of $Al_2O_3$, $TiO_2$, $ZrO_2$, $Y_2O_3$. But there is a problem in Japanese Open Patent Application H7-311929 that the high coercive force is not obtained because magnetic crystal grains are too small.

It is shown in Japanese Open Patent Application H7-98835 and Japanese Open Patent Application H8-45073 that the high coercivity is realized by applying the alternating current bias during forming a film or it is heat-treated in the vacuum after forming a film.

SUMMARY OF THE INVENTION

But in the Granular medium, magnetic crystal grains are small and C axis which is easy magnetic orientation axis of magnetic crystal grains has randomly been orientated. So, as it is above-mentioned, coercive force improves to some extent by applying the alternating current bias or heat-treating. But the coercive force obtained from this Granular medium is not sufficient for the high density recording over square inch 5 gigabits. So, good record and reproduction characteristic can not been obtained because of reproduction output is low in recording at high recording density but noise is low. Furthermore, magnetic crystal grains are so small that the phenomenon that the thermomagnetization redueases is very remarkable and the sufficient reliability in the high recording density region can not been obtained.

As is mentioned above, the Granular medium of prior art is a low noise medium but sufficient stability for the heat disturbance is necessary for the Granular medium to realize the high recording density.

A purpose of this invention is to get high coercivity and high coercivity squareness in the low noise medium which magnetic layer takes Granular structure by giving the magnetic anisotropy to circumferential direction of magnetic crystal grain in the magnetic layer. By this, it is possible to get the magnetic recording medium which has high reproducing output in high recording density and the sufficient stability for the reduction of thermomagnetization.

Furthermore, if this medium is combined with the super-sensitive magnetic head and the condition of the magnetic storage apparatus is optimized, it is possible to get the magnetic storage with the high reliability and the recording density over 5 gigabits per 1 inch.

Above mentioned purpose can be obtained by the magnetic storage apparatus which comprising a magnetic recording medium having a magnetic layer with Granular structure and a magnetic crystal grain in the magnetic layer with circumferentially magnetic anisotropy, means for moving said magnetic recording medium in the recording direction, the magnetic head having recording part and reproduction part, means for moving said magnetic head relatively to said magnetic recording medium and means for processing the recording and reproduction signal which inputs the signal to said magnetic head and reproducing the signal output from said magnetic recording medium wherein said reproduction part of the magnetic head is magnetoresistive magnetic head.

The Granular structure is that magnetic crystal grains are separated by nonmagnetic phase in a magnetic layer.

The typical crystal grain image of an embodiment of the magnetic recording medium is shown in FIG. 1 that is showing the grain boundary drawn the line along based on TEM image of the surface of magnetic layer observed by the transmission electron microscopy(TEM).

Adjoining magnetism crystal grain has been over 1 nm to each other and it is observed clearly that the nonmagnetic phase exists between crystal grain.

The shape of the magnetic crystal grain is approximately a sphere or an ellipsoid. The thickness of magnetic crystal grain (the length of the direction which is perpendicular on the surface of a film) is smaller than the thickness of the magnetic film.

However, some crystal grains with the hemisphere or the semi-ellipsoid shape in growing process near the surface of the magnetic layer may exist. Some magnetic crystal grains with the conic, hemisphere or the semi-ellipsoid shape in initial growing process may exist that grow on the crystal grain of under layer epitaxially. To get these magnetic crystal grains, hcp (hexagonal closed package) structure which comprised of Co as a main component is used. Especially, to get higher coercive force, it is desirable that the magnetic layer includes Pt to over 20 at %. Furthermore, it is desirable that the magnetic layer are comprised of the alloy including rare earth like Nd, Sm, Pr, etc to get higher coercive force. As the alloy including rare earth, the alloy comprising of rare earth metal and transition metal which shows the high crystal magnetic anisotropy like SmCo, FeSmN, NdFeB, PrFeN is desirable and either amorphous or crystal grains can be used as the alloy.

As the nonmagnetic layer, it is possible to use oxides such as $Al_2O_3$, $SiO_2$, $Ta_2O_5$, $TiO_2$ and $ZrO_2$ or non-solution elements to Co such as C and Ag, etc. The good contact start stop characteristics (the CSS characteristics) is obtained by the oxides such as $Al_2O_3$, $SiO_2$, $Ta_2O_5$, $TiO_2$ and $ZrO_2$. The corrosion resistance is more improved by the non-solution elements to Co such as C and Ag, etc.

When the ratio of coercive force which is measured in the circumferential direction to coercive force which is measured in the radial direction (orientation ratio of the coercive force) is larger than 1.0, high coercivity squareness can be obtained. When the orientation ratio of the coercive force is lager than 1.1, it is possible to suppress to reduce the reproduction output s with the progress in the time by the reduced thermomagnetism. When the orientation ratio of the coercive force is lager than 1.2, the overwrite characteristics is improved. But, it is not desirable that the orientation ratio of the coercive force is lager than 3.0 because the media noise remarkably increases.

The shape of crystal grain of magnetic layer observed by TEM observation of the surface of magnetic layer is approximate as elliptical shape. When the area ratio of the crystal grain which the extended shaft direction of this approximated elliptical shape of the crystal grain is within 30° to the circumferential direction of the magnetic recording medium to all the crystal grain is over 45%, the high reproduction output can be obtained in the high recording density region. It is more desirable that the area ratio of the crystal grain which the extended shaft direction of this approximated elliptical shape of the crystal grain is within 30° to the circumferential direction of the magnetic recording medium to all the crystal grain is over 60% because the DC noise can be reduced.

When the length of c axis in the radial direction is larger than the length of c axis in the circumferential direction over 1% in the case that magnetic crystal grain is the hcp structure, the effective track width extends because the turbulence of the recording magnetization is corrected.

When the average particle size is equal or more than 8 nm and equal or less than 14 nm and the normalized dispersion of particle size which is normalized by the average particle size is under 0.4, the magnetic recording medium with low noise and good overwrite characteristics.

It is not desirable that the average particle size is under 8nm because the dependency of coercive force to temperature increases very much. Also, it is not desirable that the average particle size is over 14 nm because the media noise increases.

It is desirable that the coercive force measured by applying magnetic field in recording direction (in the circumferential direction of the magnetic recording medium) is over over 2500 oersted and the product of the residual magnetic flux density Br and film thickness t (Br×t) is equal or more than 40 Gauss micron and equal or less than 120 Gauss micron (40 Gauss micron≦Br×t≦120 Gauss micron) because good record and reproduction characteristic is obtained in recording density region over 1 square inch of 5 gigabits. It is not desirable that the coercive force measured by applying magnetic field in the circumferential direction of the magnetic recording medium is under 2500 oersted because record and reproduction output decreases in high recording density (over 295 kFCI) region. It is not desirable that Br×t is over 120 Gauss micron because resolution decreases and Br×t is under 40 Gauss micron because reproduction output decreases.

In this invention, Al—Mg alloy substrate plated the NiP(it is described as Al substrate in the following description) is used as the substrate. Also, chemically strengthened glass substrate with the strengthening layer on the surface of the substrate, crystallized glass substrate and amorphous carbon substrate, etc. can be used as the substrate.

In using Al substrate, it is desirable that the grooves like the concentric circular are not formed on the surface of the substrate by texturing because it is not good for reducing the floating height and holding the change of the floating height.

The under layer which is single layer or multilayer can be formed between substrate and magnetic layer.

The purpose of forming the under layer is to adhere the substrate to the film formed on the substrate, to control the crystal orientation of the magnetic layer and the crystal grains not too small and to prevent to come the impurity gas into the magnetic layer.

The magnetic recording medium can be formed roughness on the surface and underlayer with island like roughness to improve the contact start stop characteristics (the CSS characteristics).

Furthermore, to get the magnetic recording medium with the high reliability and high recording density, a carbon layer can be formed to 3 nm~20 nm thickness as a protective layer to the magnetism layer and a lubricant layer such as a parfluoroalkyl polyether layer etc. with the adsorption can be formed to 2 nm~20 nm thickness.

It is preferable for improving durability and corrosion resistance to use a carbon film added hydrogen or nitrogen, a film which comprises of chemical compound such as silicon carbide, tungsten carbide, (W—Mo)—C and (Zr—Nb)—N and a mixed film including a carbon and the above mentioned chemical compound.

It is preferable that the distance between shield layers of the 2 sheets (interval of the shield layers) should be 0.30 $\mu$m or less, which magnetoresistive sensor in Magnetoresistive effect type magnetic head used in magnetic storage device are located between the shield layers of the 2 sheets.

When the interval of the shield becomes over 0.30 $\mu$m, the resolution reduces and the phase jitter of the signal increases. So, it is not good.

Magnetoresistive effect type magnetic head uses the magnetoresistive sensor which is comprised of plurality of electroconductive magnetic layers which magnetic directions relatively change by the external magnetic field and electroconductive nonmagnetic layer disposed between those electroconductive magnetic layers. Furthermore, by using giant magnetoresistive effect or spin valve effect, the strength of the signal can be intensified and magnetic storage device with the high reliability and the recording density over square inch 6 gigabits can be realized.

It is variable to realize the purpose of this invention that a magnetic storage device, comprising a magnetic recording medium, a drive division that drives said magnetic recording medium in the record direction, a recording division and a regeneration division comprises magnetic head, a means that the said magnetic head is put on in the relative motion for the said magnetic recording medium, a signal processing means for carrying out signal input to the said magnetic head and output signal regeneration from the said magnetic head, the said magnetic storage device uses a medium that has a following features;

a magnetic layer in the said magnetic recording medium is formed on the substrate through monolayer or multiple underlayer, comprises said magnetic recording medium, the said magnetic layer has granular structure that the magnetic crystal grain is separated by the nonmagnetic phase, and the coercive force orientation ratio is bigger than 1.

Also, it is variable that a magnetic recording medium comprising;

a magnetic layer is formed on the substrate through monolayer or multiple underlayer, the said magnetic layer has granular structure that the magnetic crystal grain is separated by the nonmagnetic phase, in the approximation that the said magnetic crystal grain is ellipsoid, the area ratio of the crystal grain of which the extended shaft direction is within 30° from circumferential direction is over 45%.

Also, it is variable that a magnetic recording medium comprising;

a magnetic layer is formed on the substrate through monolayer or multiple underlayer, the said magnetic layer has granular structure that the magnetic crystal grain is separated by the nonmagnetic phase and c shaft length radialy measured swells over 1% compared to a shaft length circumferentially measured.

BRIEF DESCRIPTION OF THE SEVERAL VIEW OF THE DRAWING

FIG. 1

It shows a schema of TEM image showing the surface of magnetic layer of an embodiment of magnetic recording medium in this invention.

FIG. 2

(a) shows a schema of an embodiment of magnetic recording device in this invention.

(b) shows a sectional view of this embodiment of magnetic recording device.

FIG. 3

It shows a cross section structure of magnetic head.

FIG. 4

It shows a sectional view of an embodiment of the magnetoresistive sensor of magnetic head used in the magnetic storage device in this invention.

FIG. 5

(a) shows a schema of sputtering system used in this invention.

(b) shows a sectional view of this sputtering system.

FIG. 6

It shows a schema of the relation of relative position between substrate and shutter in the system of sputtering system.

FIG. 7

It shows a schema of sectional view of an embodiment of magnetic recording medium in this invention.

FIG. 8

It shows the graph in which extended shaft and minor axis of the ellipse are plotted when a magnetic crystal grain approximates as an ellipse.

FIG. 9

It shows the histogram which shows the relationship between area ratio rate and angle made with extended shaft direction and circumferential direction of magnetic crystal grain.

FIG. 10

It shows the relationship of coercive force squareness, changing rate of reproduction output, overwrite characteristics and orientation ratio of coercive force in the magnetic recording medium.

FIG. 11

It shows a sectional view of another embodiment of the magnetoresistive sensor of magnetic head used in the magnetic storage device in this invention.

FIG. 12

It shows the relationship of a grain size and the estimation area ratio.

FIG. 13

It shows the average grain size of the magnetic crystal grain and the normalized media noise and the change rate of the coercive force with the change of the temperature.

DETAILED DESCRIPTION OF THE INVENTION

<Embodiment 1>

Figure 2A:
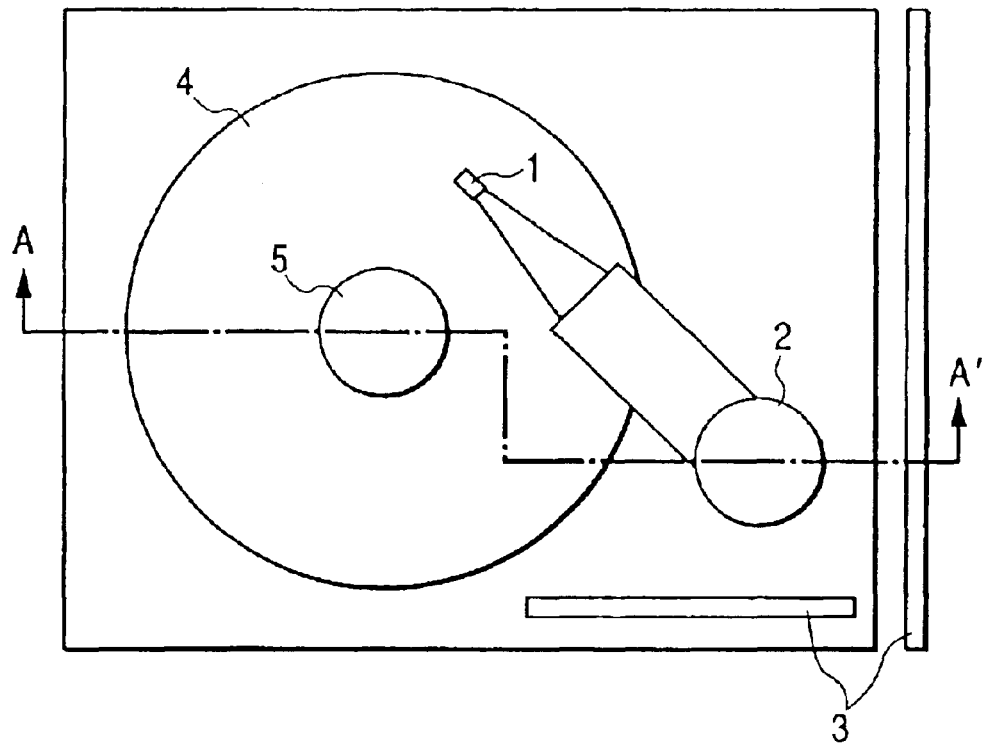
Figure 2B:
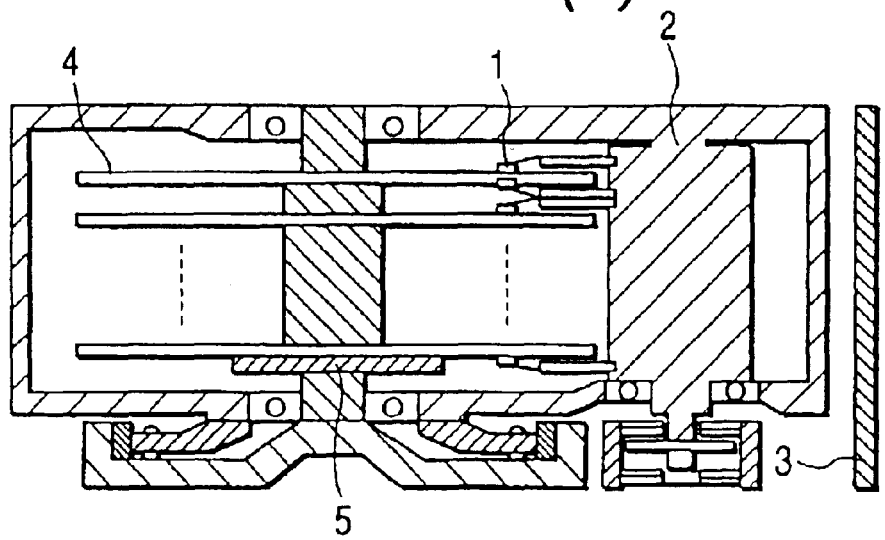
Figure 3:
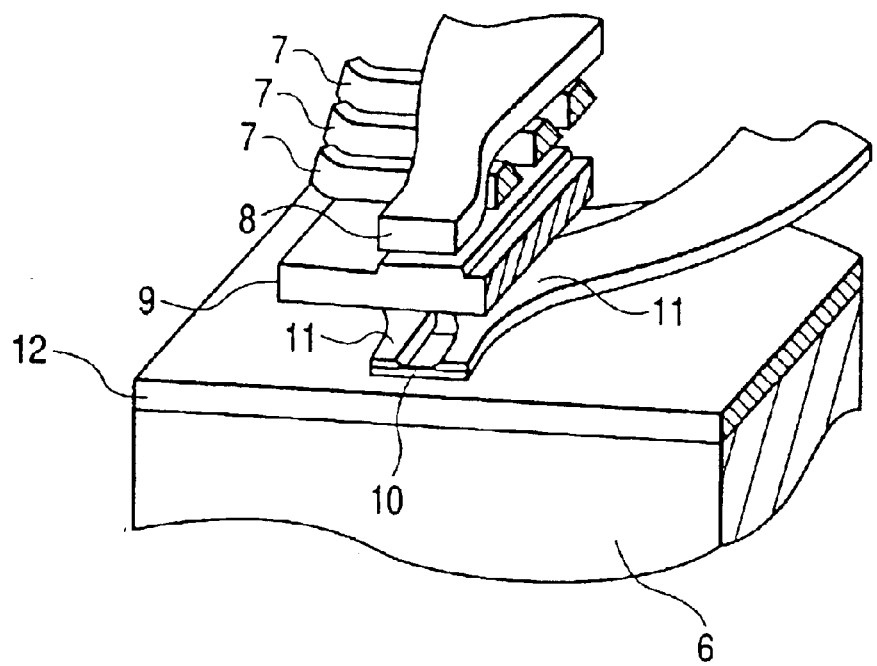
Figure 4:
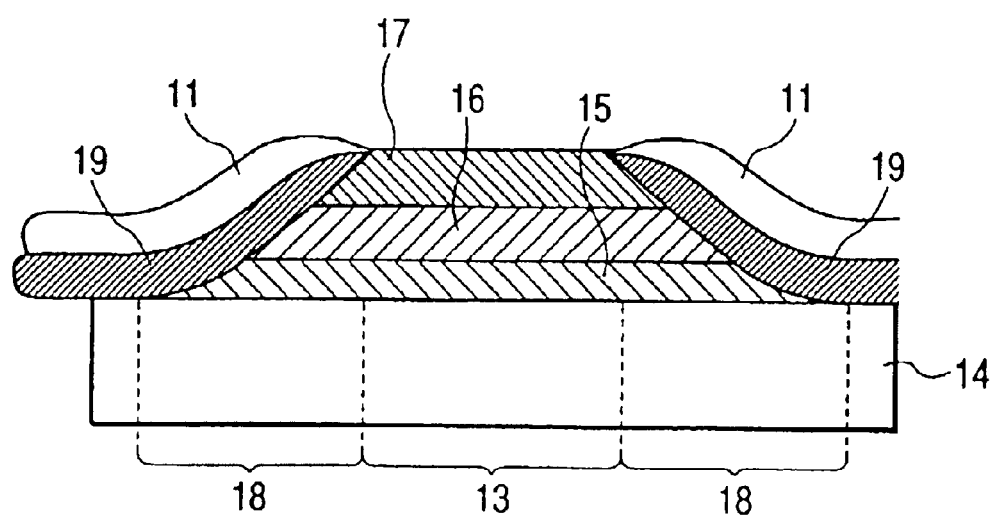

Following section explains one of the embodiments of this invention using the FIG. 2, FIG. 3, FIG. 4. FIG. 2(a), FIG. 2(b) shows a plan view and cross section view of the magnetic storage device of this embodiment. This device is a magnetic storage device with well known structure comprised of the magnetic head 1, it's driving division 2, and signal recording and regeneration processing means 3, the magnetic recording medium 4 and the driving division that rotates the said magnetic recording medium.

FIG. 3 shows a structure of the said magnetic head. This head is a combined head in which a magnetoresistance effect type head for regeneration and the electromagnet-inducting magnetic head for recording are combined, both formed on base substances of 6. The magnetic head for recording is comprised of upper record magnetic pole of 8 and lower record magnetic pole and upper shield layer of 9 which held coils of 7 The gap layer thickness between records magnetic pole was made to be 0.3 µm. Cu of 3 µm thickness is used for the coil. The magnetic head for regeneration is comprised of the magnetoresistive sensor 10 and electrode pattern of 11 of the double end. The magnetoresistive sensor is together located in lower record magnetic pole and upper shield layer and lowers shield layer 12 of the 1 µm thickness. The shield interlayer distance is 0.25 µm. Still, the following were omitted in figures of 3; Gap layer between records magnetic pole and gap layer between shield layer and magnetoresistive sensor.

FIG. 4 shows cross sectional structure of the magnetoresistive sensor. Signal detection region 13 of the magnetic sensor is comprised of the gap layer of 14 of oxidation Al, the bias layer of 15, the separating layers of 16, the magnetic resistance ferromagnetism layer of 17. Each layer are formed in order on the layer of 14. NiFe alloy of 20 nm is used in the magnetic resistance ferromagnetism layer.

Though 25 nm NiFeNb is used in the bias layer in this embodiment, other ferromagnetic alloy with appropriate electric resistance and soft magnetism such as NiFeRh can be used too. A sense current that flows in the magnetic resistance ferromagnetism layer induces a magnetic field, then it magnetizes the bias layer in the current and perpendicular direction (transverse direction) in layer surface, so that the bias layer applies the magnetic field mentioned above to the magnetic resistance ferromagnetism layer. As a result, a magnetic sensor that shows linear regenerated output for leakage magnetic field from the medium is obtained.

Ta with high electric resistance and thickness of 5 nm is used for the separating layer in order to prevent the separation of the sense current from the magnetic resistance ferromagnetism layer. In the double end in the signal detection region, there are tapers division 18 processed in the taper shape. The taper shape is comprised of permanent magnets layer 19 for making the single-magnetic domain of the magnetic resistance ferromagnetism layer and paired electrodes of 11 for taking out the signal formed in the top. The permanent magnet layer 19 is required to have the big coercive force to prevent the magnetic direction changes easily, so that CoCr, CoCrPt alloys, etc. are used.

Figure 5A:
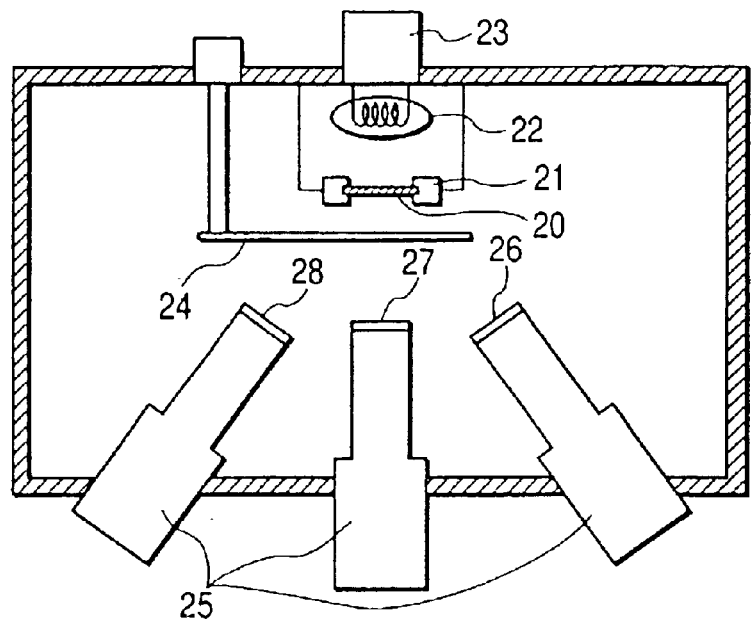
Figure 5B:
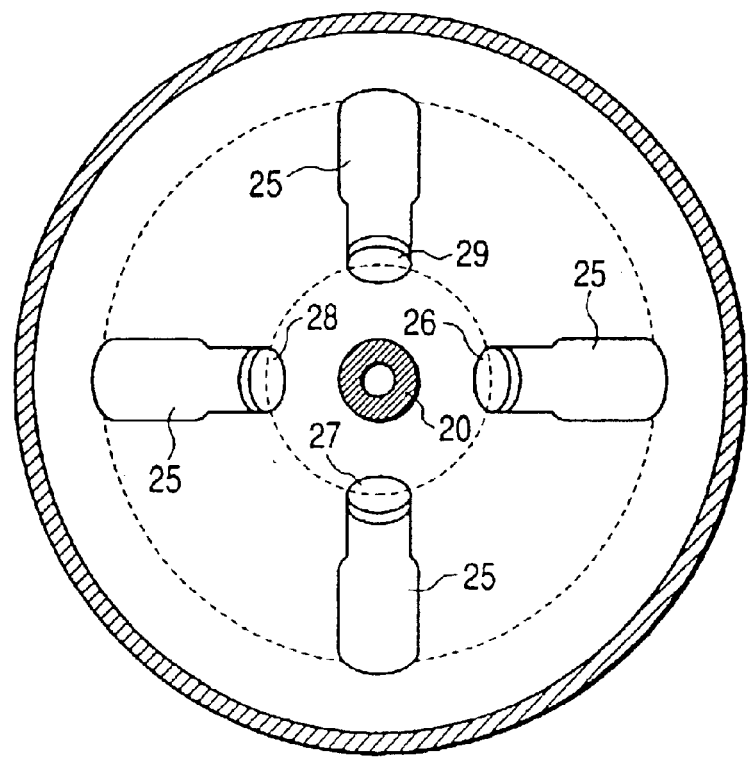

FIG. 5(*a*) and FIG. 5(*b*) shows the cross sectional view and the plan view of the film production equipment that is used in this embodiment, respectively. This equipment consists of substrates of 20, substrate holder of 21 which retains substrates, lamp heater of 22 installed in the substrate back, drive division of 23 that rotates substrate, shutters of 24 and 4 cathodes of 25. The following is installed in each cathode: first underlayer target of 26, the second underlayer target of 27, magnetic layer target of 28, protective layer target of 29. Each target holder can move to the horizontal direction, hence target-substrate distance and incidence angle of sputtered particle are controllable, though not shown in the figure. The shutter is closed only in the formation of the magnetism layer in order to give the circumferential magnetic anisotropy in the medium.

Figure 6A:
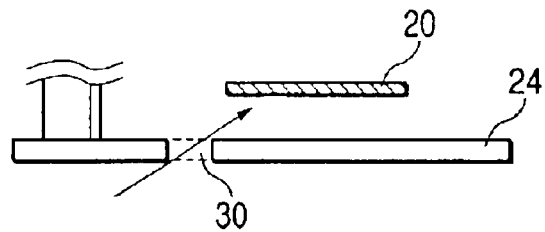
Figure 6B:
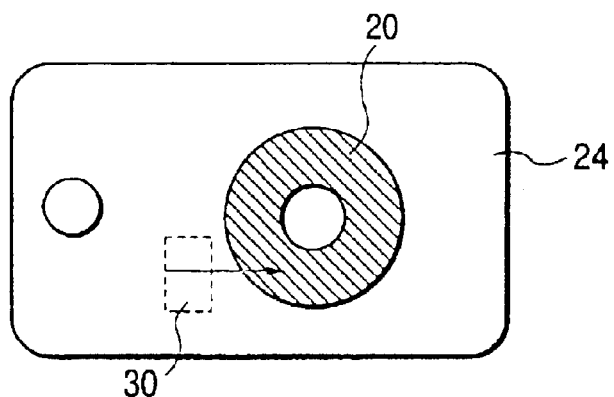

FIG. 6(*a*) and FIG. 6(*b*) shows a configuration of substrate, shutter and shutter, rectangular opening of 30 that installed on the shutter, in time of the magnetic layer being formed. The cathode that installed the magnetic layer target is placed at the space left side, though not noticed in the figures. At this time, the sputtered particle of the magnetic layer target that comes from left side of the figure is shut in the shutter, only the sputtered particle that passed the opening reaches the substrate. Therefore, incidence direction of the sputtered particle always turns parallel to the circumferential direction of the substrate as noticed in the arrow in the figure.

Figure 7:
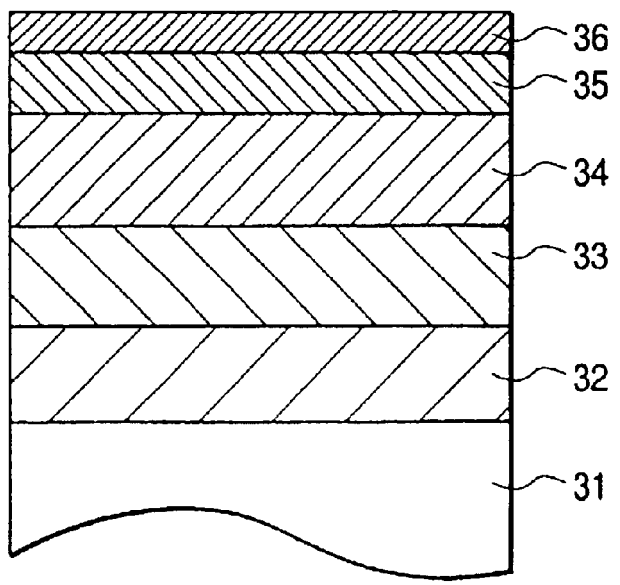

The layer structure of magnetic recording medium of this invention is shown in FIG. 7. Smooth Al substrate of 31 that has not conducted the texturing processing is heated to 180° C., then 30 nm Cr layer for first underlayer of 32, 22 nm Cr-5 at % B layer for second underlayer of 33, 22 nm (Co-25 at % Pt)-12 mol % SiO2 alloy layer for magnetic layer of 34, 6 nm carbon layer for protective layer 35 are formed in order, respectively. Each layer is formed in 5 mTorr atmosphere using mixed gas which added the 10% nitrogen in Ar all.

In all X-ray profiles of the medium in this embodiment, plural diffraction peaks from the magnetic layer are observed. From the observation, it is found that the Co alloy takes hcp structure and the c axis, which is an easy axis of magnetization, is random oriented almost three-dimensionally. Bright field image of the magnetism layer surface is taken with the transmission electron microscopic observation (the TEM observation). A granular structure is confirmed from the TEM observation.

Next, the detailed grain size analysis is carried out by the following technique. To begin with, bright field images in the magnification from several tens to 1 million times is incorporated in the scanner, then displayed on the personal computer screen.

Figure 8:
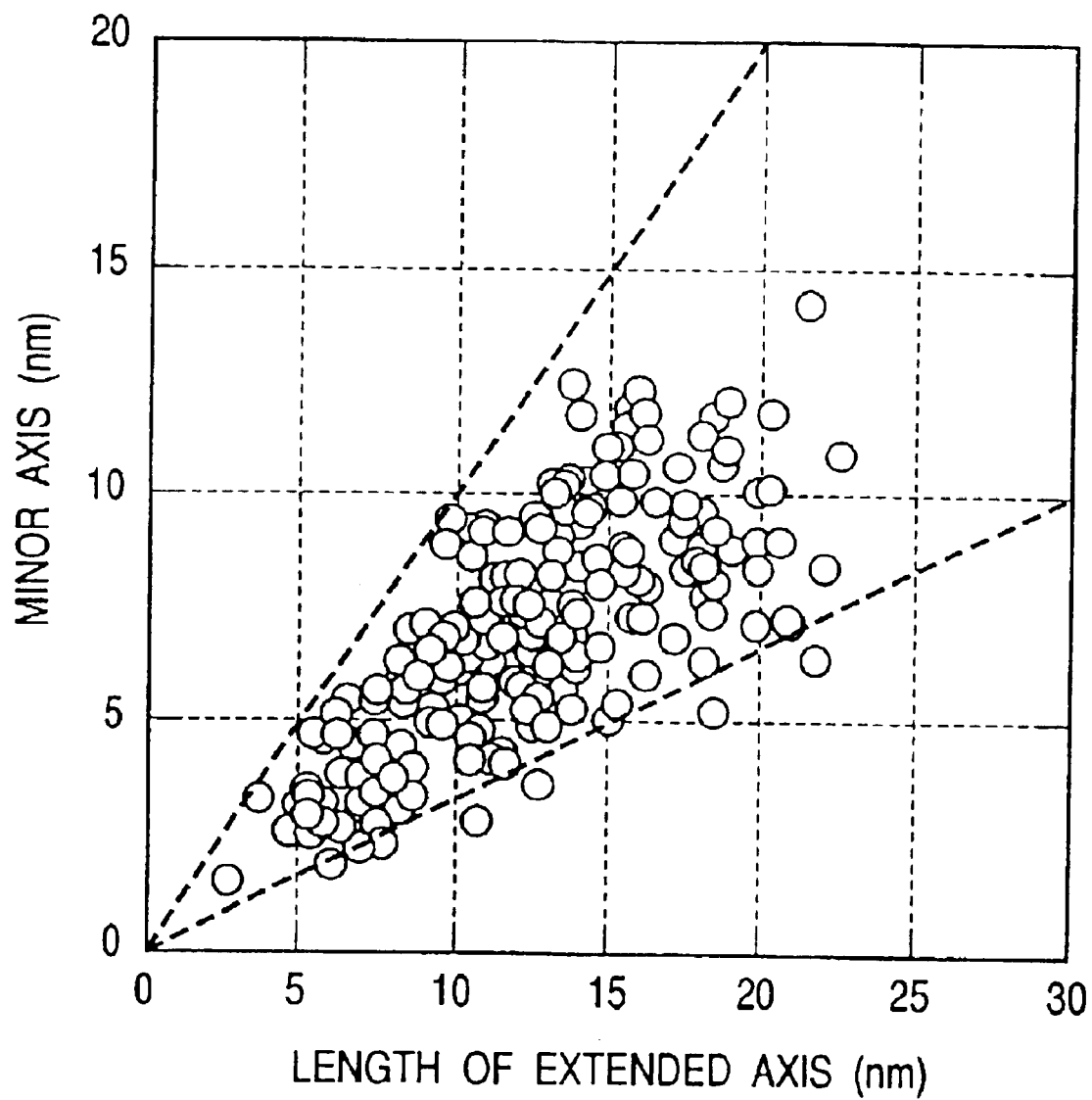

A solid curve is drawn along the grain boundary, then the outline of the grain boundary of individual magnetic crystal grain is figured as shown in FIG. 1. The length of a major axis, that of a minor axis and area of each crystal grain are estimated with the approximation that the each crystal grain is ellipse, using the particle analysis software of commercially sold. Values of the length of major axis and minor axis are plotted in FIG. 8. FIG. 8 shows the ratio of minor axis and major axis is distributed approximately within the range of 1 to 3.

Figure 9:
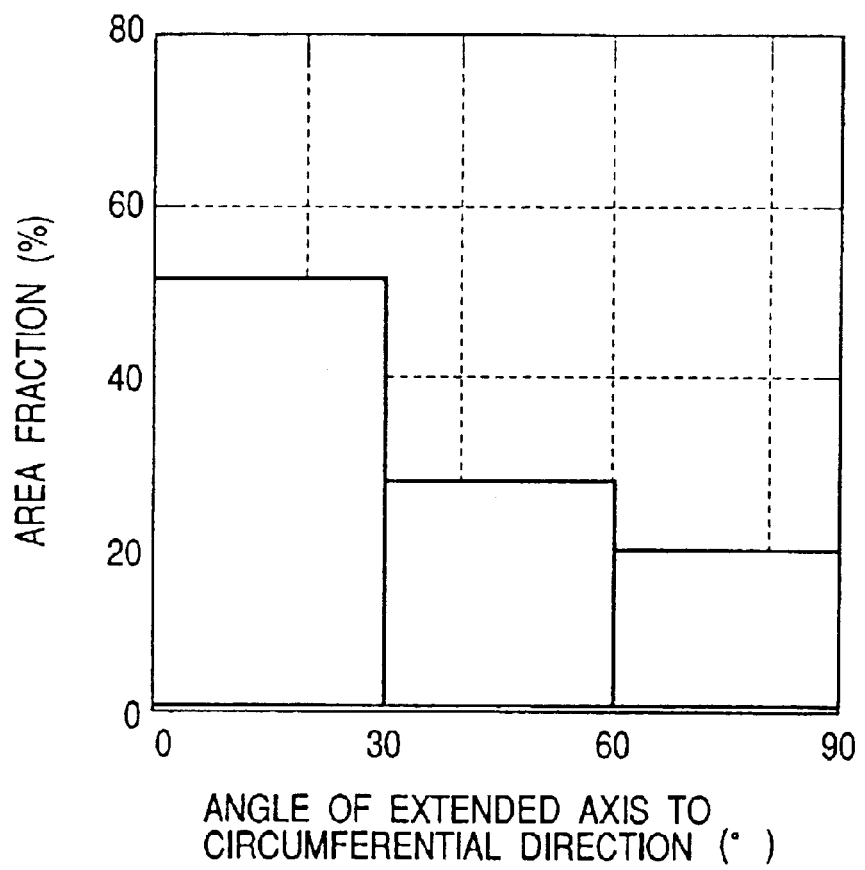

FIG. 9 is the histogram that shows the distribution of area ratio of the magnetic crystal grain in one of the medium of this embodiment, wherein $\theta$ is the angle which the major axis direction makes with the circumferential direction of the medium. $\theta=0°$ means the circumstance in which the major axis turns to the circumferential direction, $\theta=90°$ means the circumstance in which the major axis turns to the radial direction of the medium. In this medium, area ratio of the magnetic crystal grain in which $\theta$ is in the region of 0~30°, that is to say, the major axis is within 30° from the circumferential direction takes maximum value, 52.1%.

From this fact, the shape of the magnetic crystal grain becomes an ellipsoid approximately and the dispersion of directions of the major axis is not isotropic and the major axis of the magnetic crystal grain is oriented to the circumferential direction, by applying the said layer deposition procedure. Therefore, the magnetic anisotropy that is caused from the shape magnetic anisotropy of each magnetic crystal grain is introduced into the medium of this embodiment.

Media noise is measured under the circumstance that the signal is recorded at the 295 kFCI linear recording density. All the media show low normalized media noise as little as under 0.018. Here, the normalized media noise is defined as the media noise normalized with the signal output of regenerated signal and the track width. In the following section, the media noise is defined by the way mentioned above without notice.

Figure 10:
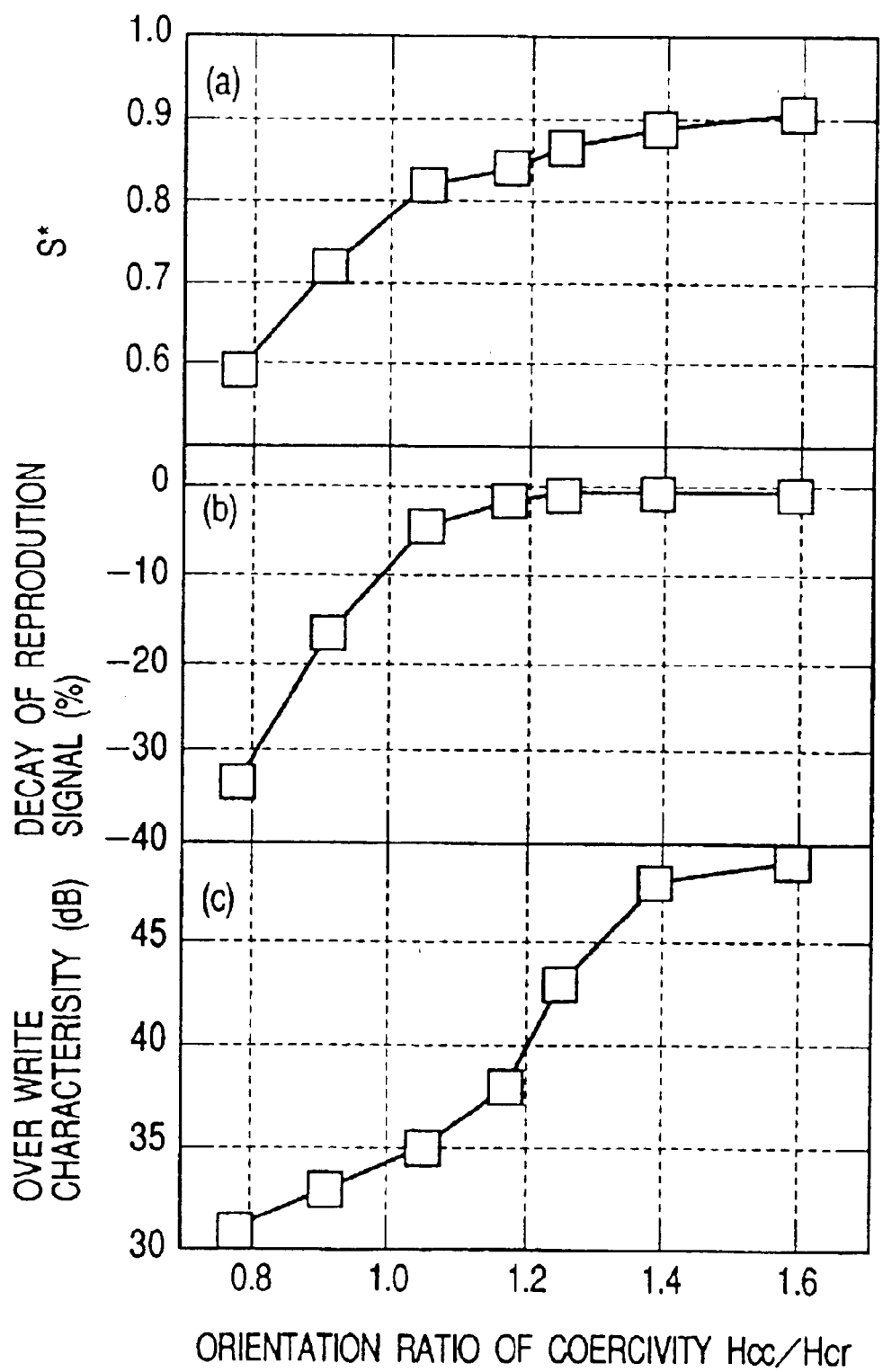

The relationship between coercive force orientation ratio Hcc/Hcr and coercive force squareness ratio S*, damping ratio of regenerated output signal, overwrite property are shown in FIGS. 10(*a*), (*b*) and (*c*) respectively. Here, Hcc is defined as the coercive force measured under the magnetic field is applied to the circumferential direction of the medium. Hcr is defined as the coercive force measured under the magnetic field is applied to the radial direction of the medium.

The damping ratio of regenerated output signal is defined as (E48 h–E0)/E0, wherein E0 is defined as the regenerated signal output just after the input signal is recorded, E48 h is defined as the regenerated signal output after 48 hours from the input signal is recorded.

Each medium with high coercive force orientation ratio over 1 shows high coercive force squareness ratio over 0.8 in FIG. 10(*a*).

For the medium with coercive force orientation ratio is over 1.1, the damping ratio of regenerated output signal is suppressed over −1%. In addition, overwrite property is over 40 dB for the medium of which coercive force orientation ratio is over 1.2.

From the results mentioned above, it is found that the high coercive force squareness is obtained with the media noise being maintained low by keeping the coercive force orientation ratio higher than 1 for the medium in which the magnetic layer takes granular structure. It is also found that the damping of output of regenerated signal is suppressed by keeping the coercive force orientation ratio over 1.1 and overwrite property is further improved by keeping, the coercive force orientation ratio over 1.2

The signal regeneration property is evaluated under the condition that the recording density is 5 gigabits per one square inch. The lubricants of 36 is applied on the medium of this embodiment, then the medium is set in the magnetic storage device with the said magnetic head. High device S/N as much as 2.1 is obtained. CSS test is also carried out. The friction coefficient is less than 0.2 even after 30000 times CSS.

<Embodiment 2>

Using the equipment equal to practical embodiment 1, V underlayer with thickness of 20 nm, (Co-15 at % Sm)-20 at % Ag magnetic layer of 14 nm, carbon protective layer of 6 nm are formed in order on chemical strengthening glass substrates. After V underlayer is formed, the substrate and the underlayer is heated to 150° C. by the lamp heater.

The formation of the magnetic layer is proceeded by placing Sm chip and Ag chip on the Co target, and the composition of the magnetic layer is controlled by the number of Sm chip and Ag chip. The substrate is rotated at 10~30 rpm. The shutter is closed during the deposition of the magnetic layer as mentioned in the embodiment 1. All of the layer is deposited in the mixed gas atmosphere of 20% nitrogen added Ar. The medium that the magnetic layer is deposited in the condition of the shutter open is also produced, as a comparison example.

X-ray diffraction measurement is carried out on the medium of this embodiment and the medium for comparison. A clear diffraction peak from the magnetic layer is not observed, therefore the magnetic layer has an amorphous or microcrystal structure which is similar to amorphous. The granular structure in which each magnetic grain is separated by the non-magnetic phase of 2~3 nm is found out in the magnetic layer. By applying the same procedure described in embodiment 1, The area ratio of the magnetic crystal grain in which the angle θ defined by the major axis and the circumferential direction of the medium is within 30° is evaluated. All the area ratio of the medium of this embodiment are more than 45%. On the medium of this embodiment and the medium for comparison, said area ratio, damping ratio of regenerated signal output after 48 hours described in embodiment 1 and the regenerated signal output at the linear recording density 295 kFCI are summarized in table 1.

TABLE 1

|  | area fraction of crystal grains which extended axis is in I30° to circumferential direction of media (%) | decay of reproduction (%) | reproduction signal (at 295KFCl) (μ Vp-p) |
| --- | --- | --- | --- |
| embodiment 2.1 | 52.6 | −0.8 | 130.4 |
| embodiment 2.2 | 65.9 | −0.9 | 121.6 |

TABLE 1-continued

|  | area fraction of crystal grains which extended axis is in I30° to circumferential direction of media (%) | decay of reproduction (%) | reproduction signal (at 295KFCl) (μ Vp-p) |
| --- | --- | --- | --- |
| embodiment 2.3 | 47.8 | −0.7 | 129.1 |
| comparison example 2.1 | 35.1 | −22.9 | 97.3 |
| comparison example 2.2 | 30.8 | −29.1 | 95.8 |

All the damping ratio of regenerated signal output of this embodiment is more than −1%. The regenerated signal output at 295 kFCI is also 20~30% higher than that of the medium for comparison. In the roll-off curve that shows a relationship between linear recording density and the output signal, the D50 defined as a linear recording density as regenerated output reduces by half is increased in 30~50 kFCI. It is caused in the circumferentially oriented strong shape magnetic anisotropy that comes from the said large area ratio over 45%. From them, it is clarified that the attenuation of the regenerated output from the thermomagnetic relaxation is suppressed and the high regenerated signal output is obtained at the high linear recording density, by maintaining the area ratio of the magnetic grain in which the major axis is within 30° from the circumferential direction of the medium higher than 45%. Regenerated signal output property at the recording density of 5 gigabits per one square inch is evaluated. The medium is set in the magnetic storage device mentioned in embodiment 1, then interface condition is optimized. High device S/N as much as 1.9 is obtained.

<Embodiment 3>

On the crystal glass substrate cleaned with alkali, 50 nm Nb for underlayer is deposited at room temperature. It heated with lamp-heater, then 30 nm (Co-25 at % Pt)-24 mol % SiO2 alloy for magnetic layer and 6 nm carbon for protective layer are deposited continuously. All the layer are deposited in the 5 mTorr Ar atmosphere and the substrate is rotated at 30 rpm. The film production equipment mentioned in embodiment 1 is used for the deposition of the layers. In the film production equipment, an adiabatic reflector having a the circular opening of the 3 cm grain size in center is installed between the lamp heater and the substrate. The substrate is rotated at 10~30 rpm in order to change the incidence angle of sputtered particle to the substrate. All the layer are deposited in the condition that the shutter is opened. Temperature of the substrate is measured after the substrate is heated by the infrared ray monitor. Temperature of the substrate is decreased from inner circumference to outer circumference and isothermal region is distributed for a concentric circle. For the comparison, another medium is formed in the film production equipment with the said adiabatic reflector is removed. Conditions of depositing of layers are same condition as mentioned above.

TEM observation is carried out to examine a microstructure of the magnetic layer. From TEM observation, both the medium of this embodiment and comparison is found out to have the granular structure in which the magnetic crystal grain of 9~11 nm grain size is separated by the non magnetic phase. X-ray diffraction measurement is also carried out. From X-ray diffraction measurement, it is found out for the magnetic layer in both of the media to have the HCP structure. The c axis, namely an easy axis of magnetization is almost three-dimensionally random oriented. In addition, X-ray diffraction measurement in two method described in the following is carried out.

In the first method, the scattered vector Δ k(=k2−k1) which is a difference between the wave vector k1 of the scattered X-ray and the wave vector k2 of the incident wave is orthogonalized to medium circumferential direction and makes 78° against the normal direction of the medium during the θ−2 θ scan is carried out. In the second method, the scattered vector Δ k is orthogonalized to the medium radial direction of the medium and makes 78° against the normal direction of the medium during the θ−2 θ scan is carried out . A weak diffraction peak is observed near 2 θ=42° for the medium of this embodiment. The peak position by the first method is shifted to the low-angle side compared to the peak position by the second method.

This suggests that the c axis length of magnetic grain of which c axis is turned to the circumferential direction is compressed compared to the c axis length of magnetic grain of which c axis is turned to radial direction. The c axis length is calculated form the peak position 2 θ under the Bragg condition. The c axis length to circumferential direction is expanded 1.4% compared to the c axis length to the radial direction. On the other hand, the difference of c axis length between circumferential direction and the radial direction in the medium for comparison is less than 1%. It is caused by compressive stress against the circumferential direction in the concentric circular isothermal region, wherein compressive stress is introduced by the temperature distribution that decreased from inner circumference to outer circumference.

TABLE 2

|  | c axis of radial direction / c axis of circumferential direction | decay of reproduction signal (%) | effective track width of reproduction head (μm) |
| --- | --- | --- | --- |
| embodiment 3.1 | 1.014 | −0.8 | 2.12 |
| comparison example 3.1 | 1.006 | −29.1 | 1.72 |

In table 2, the ratio of radial c axis length and circumferential c axis length, damping ratio are summarized. While the damping ratio of the medium for the comparison is about 30%, the damping ratio of this embodiment is suppressed more than −1% as summarized in table 2. The effective regeneration track width recorded at 200 kFCI is also summarized in table 2. The effective regeneration track width is defined as a width between the point at which the output signal is dropped to 5% of its maximum value from 95% of its maximum. The effective regeneration track width of the medium for this embodiment is 20% larger than that for comparison, suggesting for the medium of this embodiment to have low attenuation in the edge of track. It is caused by the magnetic anisotropy against the circumferential direction. Co alloy crystal has negative magnetro-striction constant in the c axial direction, therefore the magnetic anisotropy to the circumferential direction is induced by the compression for Co alloy crystal to the circumferential direction.

Figure 11:
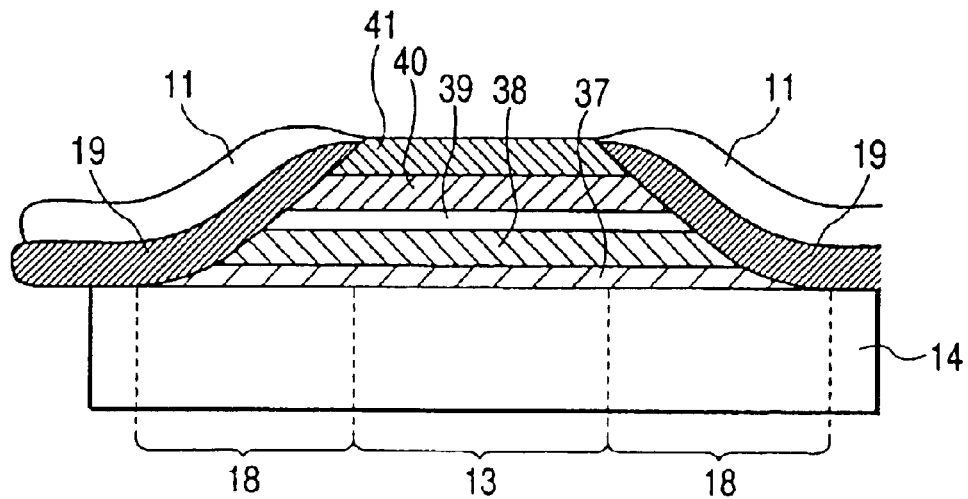

The medium of this embodiment and the combined head in which the sensor shown in FIG. 11 is used for regeneration head portion are set in the magnetic storage device mentioned in embodiment 1. This sensor has a following structure; gap layer 14, 5 nm Ta buffer layer 34, 7 nm first magnetic layer 38, 1.5 nm Cu interlayer 39, 3 nm second magnetic layer 40 and 10 nm Fe-50 at % Mn antiferromagnetic alloy layer 41. Each layer is formed on the gap layer 14 in order. The Ni-20 at % Fe alloy is used for the first magnetic layer and Co is used for the second magnetic layer. The magnetization in the second magnetic layer is fixed to unidirection by exchange magnetic field from the antiferromagnetism layer. On the other hand, the direction of magnetization in the first magnetic layer changes by leakage magnetic field from magnetic recording medium, resulting the change in the electric resistance of entire layers.

The resistance change with the change of the relative direction of the magnetization between two magnetic layers is called the spin valve effect. In this embodiment, spin valve type magnetic head making use of this effect is used for the regeneration head portion. Tapered portion has same structure as that of the sensor in embodiment 1. Recording-regenerating property is evaluated at the recording density of 6 gigabits per one square inch. High device S/N as much as 2.0 is obtained. Friction coefficient is less than 0.2 after the 30000 times CSS test is carried out.

Furthermore, the bit error after 50000 time head seek test from inner circumference to outer circumference of the medium is less than 10 bit/plane. Over 300000 hour is achieved in average failure rate.

<Embodiment 4>

Using the same equipment as embodiment 1, after 50 nm seed layer of Ni-50 at % Ta is formed on the carbon substrate, the substrate are heated by the lamp heater to 100~400° C. and 22 nm magnetism layer of (Co-30 at % Pt)-45 at % C and 6 nm carbon protective film were formed continuously.

When the magnetic film is formed, shutter was closed and 0~−200V substrate bias was applied.

The carbon protective layer is formed in the atmosphere of the mixed gas which hydrogen is added to 20% in Ar. The other layers were formed in the atmosphere of Ar. The substrate is rotated in 20 rpm. The incidence angle to the substrate of the sputtered particle is 30°.

When the magnetic layer was observed by TEM, the Granular structure was observed, that is, the magnetic crystal grains were separated by the nonmagnetic phase.

By the diffraction of the X-ray measurement, it was observed Co alloy in the magnetic layer is the hcp structure in any medium. It proved the easy axis of magnetization has been orientated almost three-dimensional randomly.

In all the embodiments of the magnetic recording medium, coercive force orientation ratio which was observed by applying the magnetic field in Circumferential direction and radial direction of the magnetic recording medium was 1.1. The area ratio of the magnetic crystal grain that the angle θ which the extended shaft direction of magnetic crystal grain makes with the circumferential direction of the magnetic recording medium is within 30°, is over 45%.

By the technique described in embodiment 1, the image of magnetic layer was made and the grain size of each magnetic crystal grain was calculated.

The grain size is defined as an identical perfect circle which has the same area as the area of the magnetic crystal grain.

Figure 12:
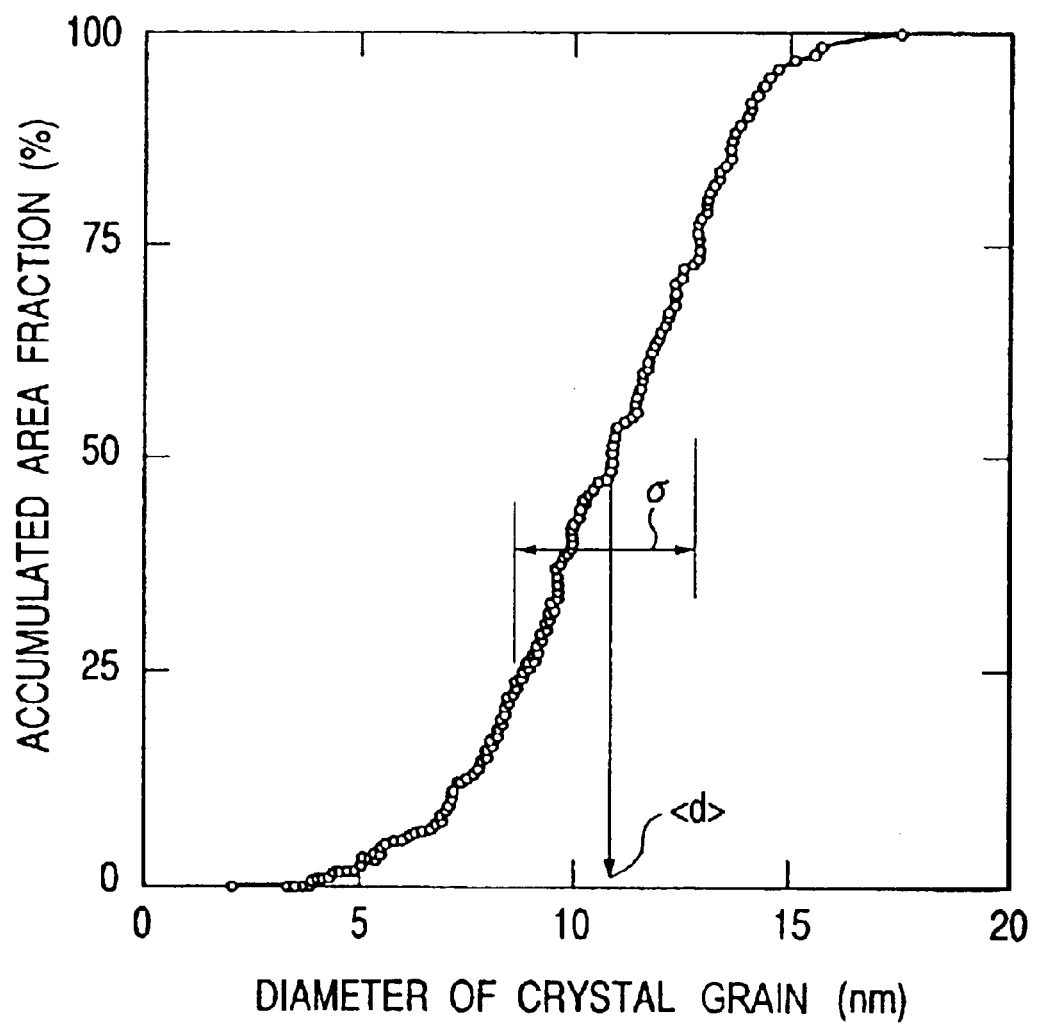

FIG. 12 shows that the grain size in this embodiment and the estimation of the area of the crystal grain having this diameter and the area of the crystal grain having smaller diameter. Average grain size <d> is defined as the diameter of the crystal grain when the estimation area ratio is 50%.

The grain size dispersion "s" is defined as the difference between the grain size with 75% estimation area ratio and the grain size with 25% estimation area ratio. s/<d> is defined as the normalized particle size dispersion.

Figure 13:
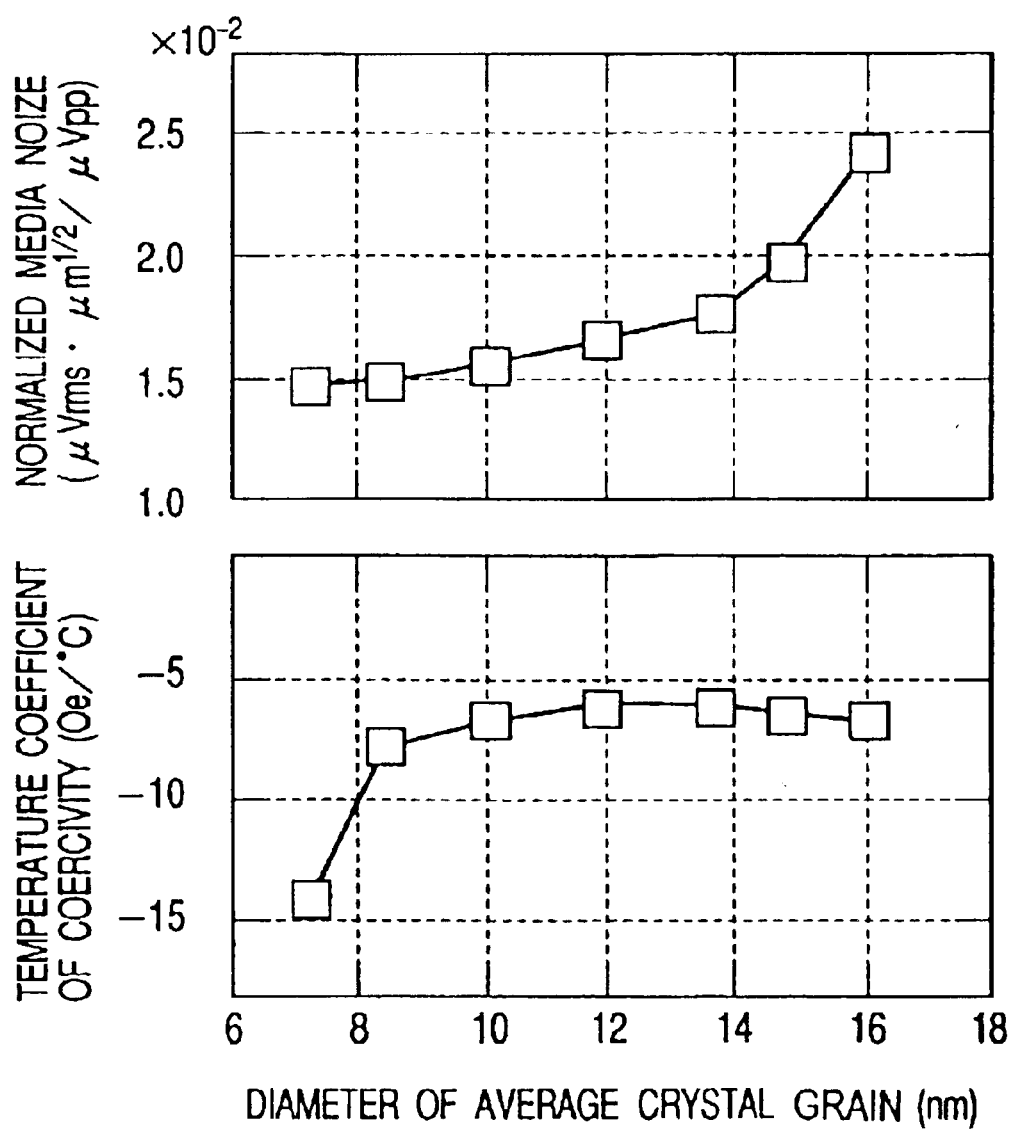

FIG. 13 shows the relation of the average grain size <d>, normalized media noise, coercive force change rate with the temperature change. The coercive force change rate with the temperature change is defined as a gradient of the straight line when the temperature changes from the room temperature to 100° C. approximates as a straight line.

It is not preferable the average grain size exceeds 14 nm because the normalized media noise increases.

It is not preferable the average grain size is under 8 nm because the coercive force change rate with the temperature change remarkably increases.

Therefore, it is desirable that the average grain size is equal or more than 8 nm and equal or less than 14 nm.

Tables 3 shows normalized particle size dispersion, normalized media noise and overwrite characteristics in magnetic recording medium with the average grain size in the above mentioned rage.

TABLE 3

|  | (d) (nm) | σ (d) (nm) | normalized media noise ($\mu$ Vrms · $\mu m^{1/2}/\mu$ Vpp) | over write characteristics |
| --- | --- | --- | --- | --- |
| embodiment 4.1 | 11.2 | 0.34 | 0.0161 | 51 |
| embodiment 4.2 | 10.8 | 0.36 | 0.0158 | 47 |
| embodiment 4.3 | 10.2 | 0.42 | 0.0174 | 34 |
| embodiment 4.4 | 9.4 | 0.44 | 0.0177 | 37 |
| embodiment 4.5 | 8.8 | 0.33 | 0.0155 | 44 |

All the embodiment shows low standardization media noise which is under 0.018.

The magnetic recording medium which standardization particle size dispersion is under 0.4 is low noise medium and the overwrite characteristics is improved about 10 dB.

The recording and reproduction characteristic of the magnetic storage device comprising of magnetic recording medium in this embodiment and spin valve type magnetic head mention in embodiment 3 were estimated under the condition of 6 gigabits per square inch. As the result, high S/N was obtained as 2.1.

By the CSS test, the friction coefficient was under 0.2 after 30000 times CSS.

The magnetic recording medium in this invention has the effect that media noise is low, reproduction output improves in the high recording density region and the change of reproduction output is suppressed by thermomagnetic relaxation.

The magnetic storage device comprising of the magnetic recording medium in this invention and magnetoresistive head, has a recording density over 5 gigabits per square inch and does not break down over 300000 hour on average.

What is claimed is:

1. A magnetic device comprising:

a magnetic recording disk; and a magnetic head, wherein the magnetic recording disk has a substrate, an underlayer which is a monolayer or multiple layer which is formed on the substrate and a magnetic layer which is formed on the underlayer, said magnetic layer has a granular structure in which magnetic crystal grains disperse in nonmagnetic phase;

a length of the magnetic crystal grain in a perpendicular direction to the magnetic layer is smaller than a thickness of the magnetic layer, a C-axis of the magnetic grain is randomly oriented in the granular structure, a ratio of Hcc to Hcr is in the range of $1.0 \leq Hcc/Hcr \leq 3.0.$, where Hcc is the coercive force measured in the circumferential direction of the magnetic recording medium and Hcr is the coercive force measured in the radial direction of the magnetic recording medium; and an area ratio of the crystal grain whose major axis direction is within 30° from a circumferential direction is 45% or more, wherein a shape of the crystal grain of the magnetic layer is approximately an elliptical shape.

2. A magnetic device according to claim 1, wherein said magnetic grains in the magnetic layer include Co or a Co alloy with a hexagonal close packed structure.

3. A magnetic device according to claim 1, wherein said magnetic grain in the magnetic layer includes the alloy of a transition metal and at least one element selected from the group consisting of Sm, Nd, Gd and Pr.

4. A magnetic device according to claim 1, wherein said non-magnetic phase of the magnetic layer includes one material selected from the group consisting of $Al_2O_3$, $SiO_2$, $Ta_2O_5$, $TiO_2$, $ZrO_2$, C, Ag.

5. A magnetic device according to claim 1, wherein the shape of the magnetic grain is observed by TEM observation of the surface of the magnetic layer.

6. A magnetic device according to claim 1, wherein the area ratio of the crystal grain is 60% or more.

7. A magnetic device according to claim 1, wherein an average magnetic grain size of the magnetic layer is equal to or more than 8 nm and equal to or less than 14 nm, and a normalized grain size dispersion of the magnetic grain is equal to or less than 0.4.

* * * * *